S. INGERSOLL.

ROCK-DRILL.

No. 7,473. Reissued Jan. 23, 1877.

Witnesses

C. M. Connell

Wm. R. Singleton

Inventor:

Simon Ingersoll

Per Blanchard & Singleton

Attys.

N. PETERS, PHOTO-LITHOGRAPHER, WASHINGTON, D. C.

UNITED STATES PATENT OFFICE.

SIMON INGERSOLL, OF BROOKLYN, NEW YORK, ASSIGNOR, BY MESNE ASSIGNMENTS, TO THE INGERSOLL ROCK DRILL COMPANY.

IMPROVEMENT IN ROCK-DRILLS.

Specification forming part of Letters Patent No. 115,478, dated May 30, 1871; reissue No. 6,293, dated February 16, 1875; reissue No. 7,473, dated January 23, 1877; application filed August 25, 1876.

*To all whom it may concern:*

Be it known that I, SIMON INGERSOLL, of Brooklyn, in the county of Kings and State of New York, have invented certain new and useful Improvements in Rock-Drills; and I do hereby declare that the following is a full, clear, and exact description thereof, that will enable others skilled in the art to which it appertains to make and use the same, reference being had to the accompanying drawings, and to the letters of reference marked thereon, which form a part of this specification.

These improvements have for their object to reduce the size of the drill, and to make it compact, and to render it less liable to breakage.

The drill to which these improvements relate is of that variety in which the drilling-tool is connected with a piston, and reciprocates as the piston does. This variety of drill is an old one, and the valves have been moved for years by a cam located outside of the cylinder, and connected with the piston-rod. In some cases this cam was so secured to the rod that it, and, consequently, the drilling-tool, could turn without turning the cam. In both plans the piston and tool could move after the valve or valves were shifted, the tappets being so contrived that the cam could pass by them, so that the piston was not stopped in its course by the cam bringing up against the tappets. These two plans have been worked out under a great variety of forms of tappets and varieties of valves.

In order to render the machine, as a whole, more compact, and still further to simplify it, I conceived the idea of projecting the tappet through the metal of the cylinder into its cavity, so that their faces which are acted upon are sometimes within the cavity or bore of the cylinder, and of moving these tappets by a prolongation of the piston, or, what is substantially the same thing, by the ends of the piston itself. It is in a drill comprising this feature, in combination with other features hereinafter specified, that my invention is embraced.

Figure 4:
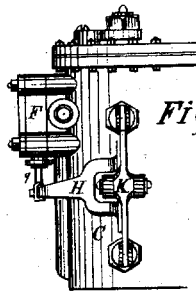
Figure 1:
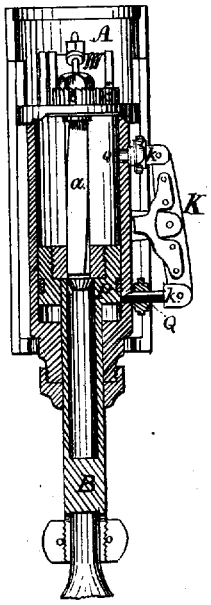
Figure 2:
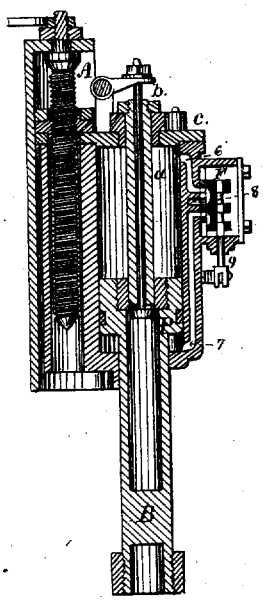
Figure 3:
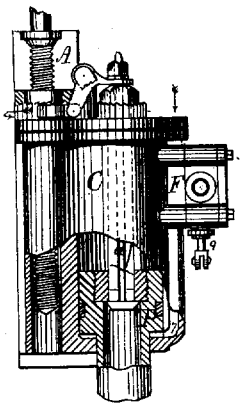

In the drawings, Figure 1 is a section in the line of the axis of the drill-cylinder. Fig. 2 is a similar section, taken at right angles to the former. Fig. 3 is a view partly in elevation and partly in section; and 4 is a plan, showing the tappet-lever, valve-stem, and chest, &c.

In these drawings, the frame supporting the cylinder is shown at A, the cylinder itself at C, the piston at P, the piston-rod at B, the tappets at *k k*, with inclined acting faces at Q Q, the tappet-lever (which is a rocking lever) at K, and at H an arm attached thereto, and, in fact, making part thereof. The valve-chest is shown at F, the valve-stem at *g*, the exhaust-passage at 8, and the passages leading to the two ends of the cylinder at 6 and 7. The valve shown in the drawings is of the B or double-cupped variety.

The operation of these parts is as follows: The piston, as it approaches either end of the stroke, strikes one of the tappets and shifts the valve, thus admitting steam against that end of the piston which is then approaching either cylinder-head, and opening the exhaust, so as to relieve the pressure upon the other end of the piston.

Inspection of the drawings will show that the tappets enter at times into the cavity or bore of the cylinder, and are actuated by the piston.

Inspection and consideration of the drawings will further show that the piston can continue its further movement after it has shifted the valve; that its movement is not arrested by the tappets, and that it can revolve with the drilling-tool, and yet act upon the tappets as efficiently as if it did not turn in its containing-cylinder, this being essential in a drill in which, from the necessities of the case, the length of stroke constantly varies, and in which the force of the blow is due partly to the pressure of the steam or air, and party to the momentum of the parts.

With the cylinder and piston I combine a mechanism for rotating the latter. One form of such mechanism is represented in the drawings, consisting of a spiral bar, *a*, attached to the upper head of the cylinder, and working in a corresponding female spiral in the piston. The spiral bar is attached to a ratchet, *b*, which is free to revolve with the spiral bar on the down-stroke of the piston; but is, with the spiral bar, held fast by the pawl C on the upstroke of the piston, which causes the piston, during this stroke, to have a rotary movement.

By organizing the drill in the manner described I attain important advantages. I shorten the drill, render it more compact, and reduce its weight, whereby the operator is enabled to get the machine in positions for mining where a longer and heavier drill could not be operated practically.

In rock-drills the piston is liable to strike against and knock out the head of the cylinder. This can occur in my machine without derangement of or injury to the valve or rotating mechanisms, which, in machines of this class hitherto employed, has not been the case.

In conclusion I would state that I do not claim, broadly, a valve-motion in which valve-actuating tappets projecting into the interior of the steam-cylinder are operated by the piston to produce the movements of the valve; but, Having described my improvements, what I claim, and desire to secure by Letters Patent, is—

The valve-operating tappets, extending laterally into the cylinder, which are combined with and operated by a piston having a reciprocating and a rotative movement imparted to it, said piston being constructed substantially as described, the above-named parts being combined with a piston-rod arranged to carry a drill-bar, and to operate substantially as and for the purpose set forth.

In testimony that I claim the foregoing I have hereunto set my hand this 19th day of August, 1876.

SIMON INGERSOLL.

Witnesses:
HENRY C. SERGEANT,
FRED. BRANDT.